US012812562B2

(12) United States Patent
Xu et al.

(10) Patent No.: US 12,812,562 B2
(45) Date of Patent: Nov. 24, 2026

(54) TECHNOLOGIES FOR POWER HEADROOM REPORTING FOR SOUNDING REFERENCE SIGNAL SETS

(71) Applicant: Apple Inc., Cupertino, CA (US)

(72) Inventors: Fangli Xu, Beijing (CN); Haijing Hu, Los Gatos, CA (US); Wei Zeng, Saratoga, CA (US); Yuqin Chen, Beijing (CN); Yushu Zhang, Beijing (CN)

(73) Assignee: Apple Inc., Cupertino, CA (US)

(*) Notice: Subject to any disclaimer, the term of this patent is extended or adjusted under 35 U.S.C. 154(b) by 747 days.

(21) Appl. No.: 18/078,900

(22) Filed: Dec. 9, 2022

(65) Prior Publication Data

US 2023/0217379 A1 Jul. 6, 2023

Related U.S. Application Data

(60) Provisional application No. 63/296,797, filed on Jan. 5, 2022.

(51) Int. Cl.
*H04W 52/36* (2009.01)
*H04W 52/24* (2009.01)
*H04W 72/231* (2023.01)

(52) U.S. Cl.
CPC ....... *H04W 52/365* (2013.01); *H04W 52/242* (2013.01); *H04W 72/231* (2023.01)

(58) Field of Classification Search
CPC ................................................. H04W 52/365
See application file for complete search history.

(56) References Cited

U.S. PATENT DOCUMENTS

| | | | | |
|---|---|---|---|---|
| 9,585,107 | B2 | 2/2017 | Xu et al. | |
| 12,363,648 | B2 | 7/2025 | Zhang et al. | |
| 2016/0330698 | A1 | 11/2016 | Loehr et al. | |
| 2016/0353440 | A1 | 12/2016 | Lee et al. | |
| 2018/0124710 | A1 | 5/2018 | Ly et al. | |
| 2018/0368081 | A1 | 12/2018 | Akkarakaran et al. | |
| 2019/0174432 | A1 | 6/2019 | Wang et al. | |
| 2019/0306874 | A1 | 10/2019 | Lohr et al. | |
| 2019/0394732 | A1* | 12/2019 | Loehr | H04L 25/0224 |
| 2020/0100193 | A1* | 3/2020 | Cheng | H04W 52/146 |
| 2020/0213955 | A1* | 7/2020 | Hosseini | H04L 5/001 |
| 2020/0267667 | A1 | 8/2020 | Molavianjazi et al. | |

(Continued)

FOREIGN PATENT DOCUMENTS

| | | |
|---|---|---|
| CN | 109089279 A | 12/2018 |
| CN | 110475334 A | 11/2019 |

(Continued)

OTHER PUBLICATIONS

International Patent Application No. PCT/CN2021/108288, International Preliminary Report on Patentability, Feb. 1, 2024, 6 pages.

(Continued)

*Primary Examiner* — Ayodeji O Ayotunde
(74) *Attorney, Agent, or Firm* — Kilpatrick Townsend & Stockton LLP

(57) ABSTRACT

The present application relates to devices and components including apparatus, systems, and methods for power headroom reporting with respect to a plurality of transmit/receive points in wireless networks.

20 Claims, 7 Drawing Sheets

(56) References Cited

U.S. PATENT DOCUMENTS

| | | | |
|---|---|---|---|
| 2021/0007139 A1 | 1/2021 | Fu et al. |
| 2022/0060998 A1 | 2/2022 | Khoshnevisan et al. |
| 2022/0210748 A1 | 6/2022 | Huang et al. |
| 2022/0217653 A1 | 7/2022 | Kung et al. |
| 2022/0225247 A1 | 7/2022 | Huang et al. |
| 2022/0256571 A1 | 8/2022 | Lo et al. |
| 2022/0338042 A1 | 10/2022 | Cirik et al. |
| 2023/0156627 A1 | 5/2023 | Yuan et al. |
| 2023/0291451 A1 | 9/2023 | Su et al. |

FOREIGN PATENT DOCUMENTS

| | | |
|---|---|---|
| CN | 111434158 A | 7/2020 |
| CN | 111901021 A | 11/2020 |
| WO | 2019192538 A1 | 10/2019 |
| WO | 2020164619 A1 | 8/2020 |
| WO | 2021188764 A1 | 9/2021 |
| WO | 2023000344 A1 | 1/2023 |

OTHER PUBLICATIONS

Enhancements on Multi-Beam Operation, R1-2105540, 3GPP TSG RAN WG1 #105-e, Xiaomi, May 27, 2021, 12 pages.
Summary #3 of Multi-TRP PUCCH and PUSCH Enhancements, R1-200XXXX, 3GPP TSG RAN WG1 #105-e, Nokia, Nokia Shanghai Bell, May 27, 2021, 10 pages.
International Patent Application No. PCT/CN2021/108288, International Search Report and Written Opinion, Mar. 30, 2022, 10 pages.
3rd Generation Partnership Project; Technical Specification Group Radio Access Network; NR; Requirements for support of radio resource management (Release 17), 3GPP TS 38.133 V17.3.0, Sep. 2021, 3207 pages.
3rd Generation Partnership Project; Technical Specification Group Radio Access Network; NR; Physical layer procedures for control (Release 16), 3GPP TS 38.213 V16.7.0, Sep. 2021, 188 pages.
3rd Generation Partnership Project; Technical Specification Group Radio Access Network; NR; Medium Access Control (MAC) protocol specification (Release 16), 3GPP TS 38.321 V16.7.0, Dec. 2021, 158 pages.
3rd Generation Partnership Project; Technical Specification Group Radio Access Network; NR; Radio Resource Control (RRC) protocol specification (Release 16), 3GPP TS 38.331 V16.7.0, Dec. 2021, 963 pages.
Revised WID: Further enhancements on MIMO for NR, Samsung, 3GPP TSG RAN Meeting #93e, RP-212535, Sep. 13-17, 2021, 6 pages.
Summary of UE features for further enhancements on NR-MIMO, AT&T, 3GPP TSG RAN WG1 #106bis-e, R1-2109912, Oct. 11-19, 2021, 118 pages.
Moderator summary #5 for multi-beam enhancement: ROUND 4, Samsung, 3GPP TSG RAN WG1 #106-e, RP-210xxxx, Aug. 16-27, 2021, 18 pages.
Status Report to TSG, Samsung, 3GPP TSG RAN Meeting #94-e, RP-213478, Dec. 6-17, 2021, 28 pages.
3rd Generation Partnership Project; Technical Specification Group Radio Access Network; ETSI; 5G; NR; Medium Access Control (MAC) protocol specification (Release 16), 3GPP TS 38.321 V16.4.0, Apr. 2021, 159 pages.
3rd Generation Partnership Project; Technical Specification Group Radio Access Network; ETSI; 5G; NR; Physical layer procedures for control (Release 16), 3GPP TS 38.213 V16.5.0, Apr. 2021, 188 pages.
3GPP TS 38.213 V16.6.0, 3rd Generation Partnership Project; Technical Specification Group Radio Access Network; NR; Physical Layer Procedures for Control (Release 16), Jun. 2021, pp. 1-187.
U.S. Appl. No. 17/441,657, Final Office Action, Jul. 2, 2024, 16 pages.
International Patent Application No. PCT/US2022/052458, International Preliminary Report on Patentability, Jul. 18, 2024, 11 pages.
U.S. Appl. No. 17/441,657, Non-Final Office Action, Dec. 20, 2023, 14 pages.
"Further Discussion on Multi-TRP for PDCCH, PUCCH and PUSCH Enhancements," Vivo, 3GPP TSG RAN WG1 #106-e, R1-2106572, Aug. 26-27, 2021, 28 pages.
International Patent Application No. PCT/US2022/052458, International Search Report and the Written Opinion, Jun. 13, 2023, 17 pages.
International Patent Application No. PCT/US2022/052458, Invitation to Pay Additional Fees and, Where Applicable, Protest Fee, Apr. 18, 2023, 8 pages.
Enhancements on Multi-TRP for PDCCH, PUCCH and PUSCH, 3rd Generation Partnership Project, Technical Specification Group, Radio Access Network, Working Group1 Meeting #105-bis-e, R1-2104655, May 10-27, 2021, 17 pages.
Summary #2 of Multi-TRP PUCCH and PUSCH Enhancements, 3rd Generation Partnership Project, Technical Specification Group, Radio Access Network, Working Group1 #105-e, R1-2106074, May 19-27, 2021, 47 pages.
U.S. Appl. No. 17/441,657, Non-Final Office Action, Oct. 23, 2024, 15 pages.
European Patent Application No. 21950593.0, Extended European Search Report, Mar. 7, 2025, 9 pages.
Summary #3 of Multi-TRP PUCCH and PUSCH Enhancements, 3rd Generation Partnership Project, Technical Specification Group, Radio Access Network, Working Group1 #105-e, R1-2106075, May 19-27, 2021, 20 pages.
China Patent Application No. 202180010717.2, Office Action, Mar. 3, 2026, 17 pages.
India Patent Application No. 202317088886, First Examination Report, Jun. 12, 2026, 9 pages.
India Patent Application No. 202417051079, First Examination Report, Sep. 7, 2026, 9 pages.

* cited by examiner

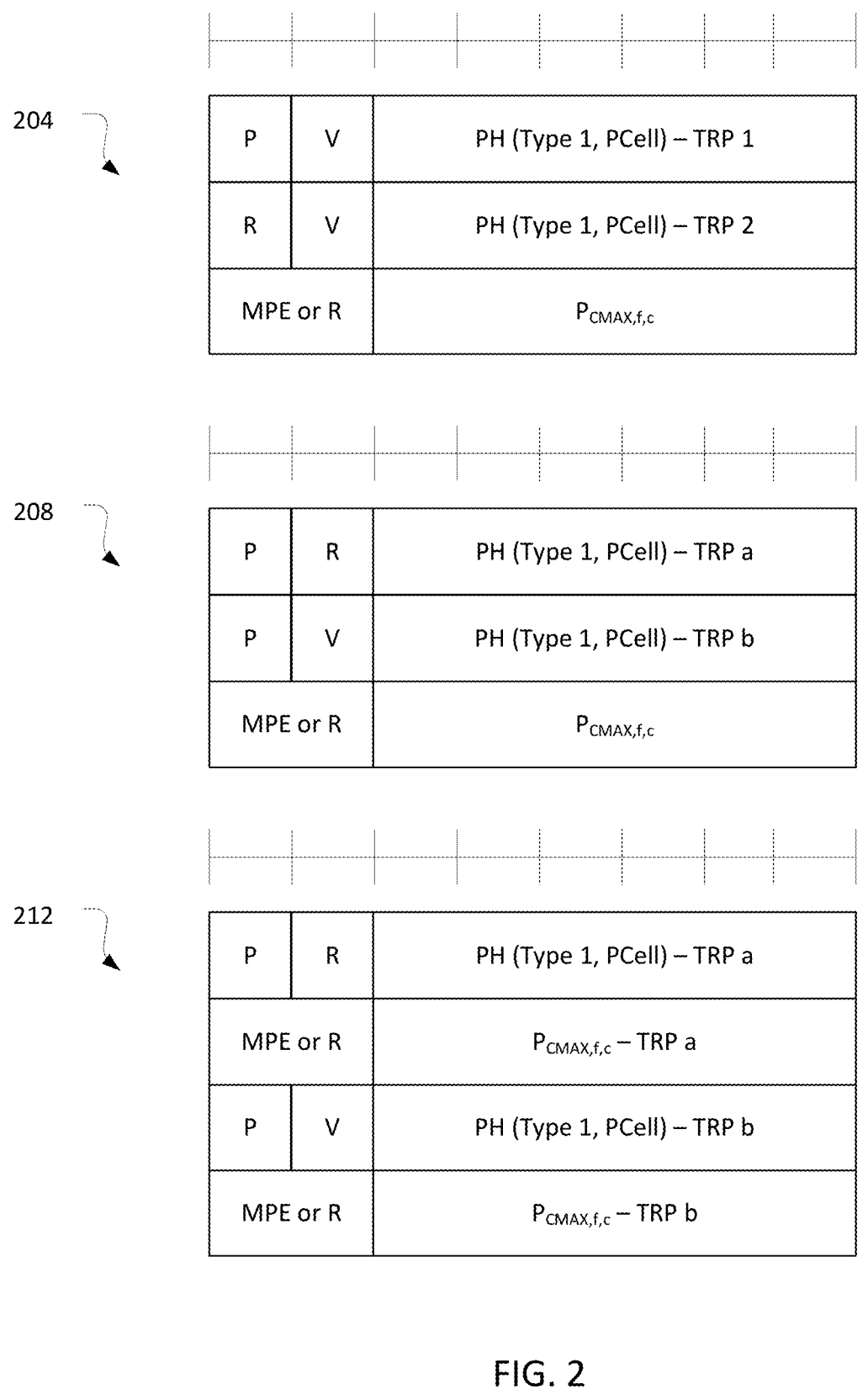

204

| | | |
|---|---|---|
| P | V | PH (Type 1, PCell) – TRP 1 |
| R | V | PH (Type 1, PCell) – TRP 2 |
| MPE or R | | $P_{CMAX,f,c}$ |

208

| | | |
|---|---|---|
| P | R | PH (Type 1, PCell) – TRP a |
| P | V | PH (Type 1, PCell) – TRP b |
| MPE or R | | $P_{CMAX,f,c}$ |

212

| | | |
|---|---|---|
| P | R | PH (Type 1, PCell) – TRP a |
| MPE or R | | $P_{CMAX,f,c}$ – TRP a |
| P | V | PH (Type 1, PCell) – TRP b |
| MPE or R | | $P_{CMAX,f,c}$ – TRP b |

FIG. 2

TECHNOLOGIES FOR POWER HEADROOM REPORTING FOR SOUNDING REFERENCE SIGNAL SETS

CROSS-REFERENCES TO RELATED APPLICATIONS

This application claims the benefit of U.S. Provisional Patent Application No. 63/296,797, filed on Jan. 5, 2022, which is herein incorporated by reference in its entirety for all purposes.

TECHNICAL FIELD

The present application relates to wireless technologies and, in particular, technologies for power headroom reporting for transmit/receive points.

BACKGROUND

Devices operating in Third Generation Partnership Project (3GPP) New Radio (NR) networks may engage in multiple-input, multiple-output (MIMO) communications enabled by multiple antennas at the transmitting or receiving device. Antennas of the radio access network (RAN) may be distributed throughout a number of transmit/receive points (TRPs). Updates to 3GPP Technical Specifications (TSs) are required to improve communication in such networks.

BRIEF DESCRIPTION OF THE DRAWINGS

FIG. 2 illustrates single-entry power headroom report (PHR) media access control (MAC) control elements (CEs) in accordance with some embodiments.

DETAILED DESCRIPTION

Figure 1:
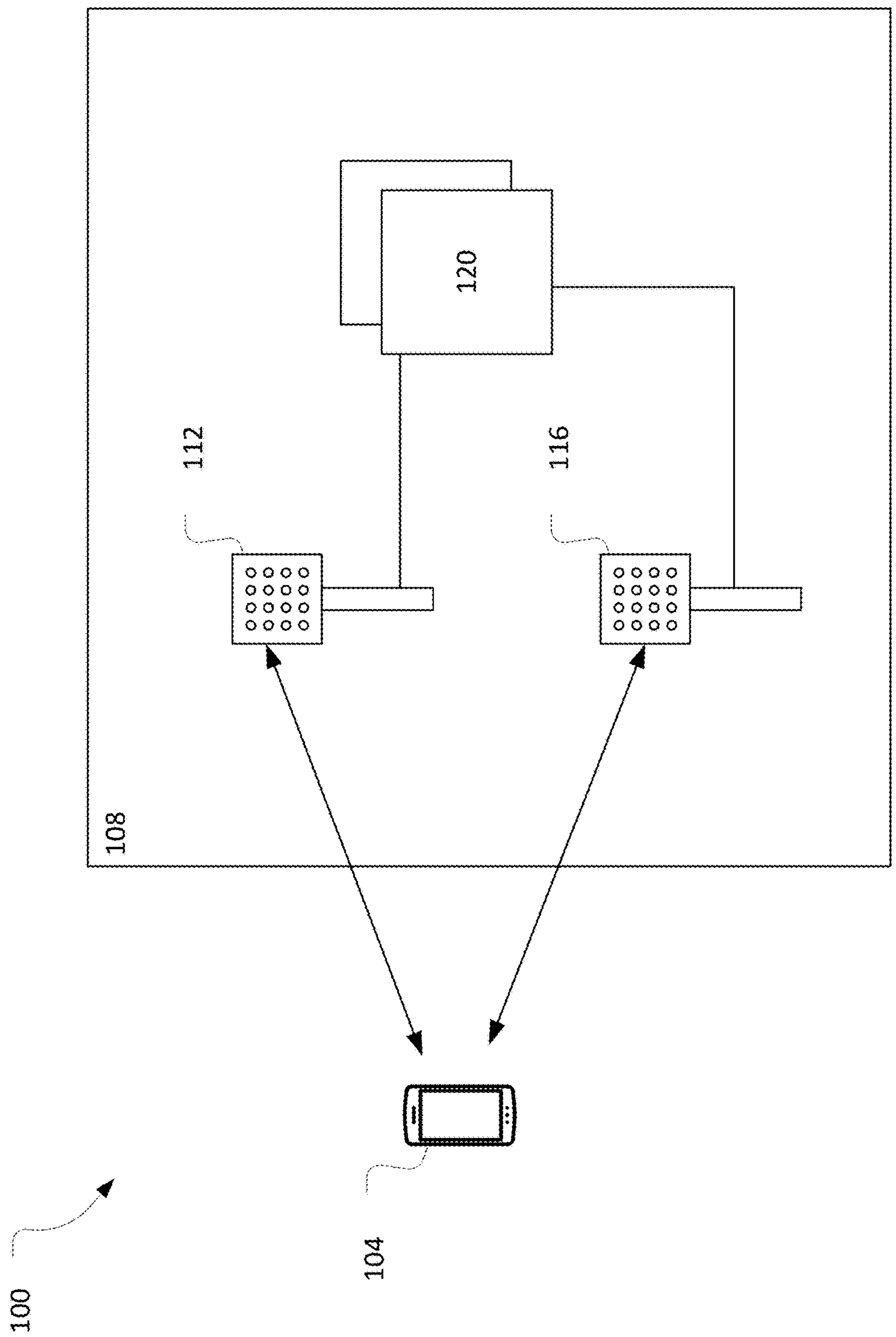
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include user equipment (UE) 104 coupled with an access network 108. The access network 108 may include a plurality of transmit/receive points (TRPs), for example, TRP 112 and TRP 116, to enable transmit/receive diversity. The TRPs 112/116 may be controlled by one or more base stations 120. The base stations 120 may use the TRPs 112/116 to provide one or more wireless access cells through which the UE 104 may communicate with the access network 108. The UE 104 and the base stations 120 may communicate over air interfaces compatible with Long Term Evolution (LTE) or Fifth Generation (5G) NR system standards as provided by 3GPP TSs. The base stations 120 may include evolved node B (eNBs) to provide LTE cells or next generation node Bs (gNBs) to provide 5G NR cells.

In multiple-TRP (mTRP) operation, the access network 108 may communicate with the UE 104 using more than one TRP, for example, TRP 112 and 116. In the downlink, mTRP operation may include transmitting physical downlink shared channel (PDSCH) transmissions from the TRP 112 and TRP 116 to the UE 104. In the uplink, mTRP operation may include the UE 104 transmitting physical uplink shared channel (PUSCH) transmissions to TRP 112 and TRP 116.

The access network 108 may provide the UE 104 with serving cells using a carrier aggregation (CA) or dual-connectivity (DC) deployment. In a CA deployment, the cells may include a primary serving cell (PCell) to provide some or all of the control signaling through signaling radio bearers (SRBs) and one or more secondary serving cells (SCells) to provide one or more data radio bearers (DRBs) to increase throughput capability of the system. A PCell may be configured on a primary component carrier (PCC) and the SCells may be configured on secondary component carriers (SCCs).

In a DC deployment, the UE 104 may be configured to utilize radio resources provided by distinct schedulers located in different base stations. One of the base stations may be configured as a master node (MN) to provide a control plane connection to a core network. The MN may be associated with the group of serving cells referred to as a master cell group (MCG), which includes a PCell and optionally one or more SCells in a CA deployment. The other base station may be configured as a secondary node (SN), which may not have a control plane connection to the core network. The SN may be used to provide additional resources to the UE 104. The SN may be associated with a group of serving cells referred to as a secondary cell group (SCG), which includes a primary cell (PSCell) and one or more SCells in a CA deployment. The configuration may be an NE-DC configuration if the MN is a gNB and the SN is an eNB that provides an LTE cell; an EN-DC configuration if the MN is an eNB and the SN is a gNB; and an NR-DC if both the MN and the SN are gNBs.

The primary serving cells (for example, PCells and PSCells) may also be referred to as special cells (SpCells).

The serving cells provided by the access network 108 may be on frequency bands within frequency range 1 (FR1) between 410-7125 megaHertz (MHz), frequency range 2 (FR2) between 24,250-52,600 MHz, or a higher frequency range.

In some instances, to increase reliability, the PUSCH transmissions may be scheduled with repetitions. The PUSCH transmissions may be repeated in one slot or across a plurality of consecutive slots.

The UE 104 may use a power headroom report (PHR) procedure to provide a base station with information to facilitate scheduling and link adaptation operations. The information provided through a PHR procedure may be Type 1 information, Type 2 information, Type 3 information, or maximum permissible exposure (MPE) information. The Type 1 information may be related to a difference between a nominal UE maximum transmit power and an estimated power for an uplink shared channel (UL-SCH) transmission per activated serving cell. The Type 2 information may be related to a difference between the nominal UE maximum transmit power and an estimated power for UL-SCH and physical uplink control channel (PUCCH) transmission on SpCell of another media access control (MAC) entity (for example, in DC case). The Type 3 information may be related to a difference between a nominal UE maximum transmit power and an estimated power for a sounding reference signal (SRS) transmission per activated serving cell. The MPE information may describe a power backoff to meet MPE FR2 requirements for a serving cell operating on FR2.

The access network 108 may control power headroom reporting by using radio resource control (RRC) signaling to configure one or more of the following parameters: a periodic timer (phr-PeriodicTimer), which is a value in number of subframes for PHR reporting; a prohibit timer (phr-ProhibitTimer), which is a value in number of subframes for PHR reporting; a transmit power factor change parameter (phr-Tx-PowerFactorChange), which is a value in decibels (dB) for PHR reporting; a Type 2 report for other cell parameter (phr-Type2OtherCell), which is set to 'true' if the UE is to report a PHR type 2 for the SpCell of the other MAC entity and is set to 'false' if the UE is not configured with an E-UTRA MAC entity; a mode for other cell group parameter (phr-ModeOtherCG) to indicate a mode (for example, real or virtual) used for activated cells that are part of the other cell group (for example, MCG or SCG) when DC is configured; a multiple PHR parameter (multiplePHR), which is set to 'true' to indicate the UE is to report the power headroom using a multiple-entry PHR MAC control element and is set to 'false' if the UE is to report the power headroom using a single-entry PHR MAC control element; an MPE reporting parameter for FR2 (mpe-Reporting-FR2) to indicate whether the UE shall report MPE power management maximum power reduction (P-MPR) in the PHR MAC control element; an MPE prohibit timer (mpe-ProhibitTimer), which is a value in number of subframes for MPE reporting; and an MPE threshold parameter (mpe-Threshold), which is a value of the P-MPR threshold in dB for reporting MPE P-MPR when FR2 is configured.

A PHR may be triggered according to any of the following trigger conditions. A first trigger condition may occur when phr-PeriodicTimer expires. A second trigger condition may occur when phr-ProhibitTimer expires or has expired and a pathloss has changed more than phr-Tx-PowerFactorChange dB for at least one activated serving cell of any MAC entity that is used as a pathloss reference since the last transmission of a PHR in the MAC entity when the MAC entity has UL resources for new transmission. A third trigger condition may occur upon configuration or reconfiguration of power headroom reporting functionality by upper layers, which is not used to disable the function. A fourth trigger condition may occur upon activation of an SCell of any MAC entity with configured uplink of which firstActiveDownlinkBWP-Id is not set to dormant bandwidth part (BWP). A fifth trigger condition may occur when a PSCell is added or changed. A sixth trigger condition may occur upon switching of an activated BWP from dormant BWP to non-dormant downlink BWP of an SCell of any MAC entity with a configured uplink. A seventh trigger condition may occur when the phr-ProhibitTimer expires or has expired and the required power backoff due to power management is greater phr-Tx-PowerFactorChange dB. An eighth trigger condition may be due to MPE.

Embodiments describe enhanced PHR features that may be used for mTRP operation. These features may be used when PUSCH repetition is configured for a serving cell. These enhancements include an enhanced PHR MAC control element (CE) that enables power headroom (PH) reporting per TRP. For example, with reference to the network environment 100, the enhanced PHR MAC CE may accommodate reporting of two PH values, one PH value may be provided for TRP 112 and another PH value may be provided for TRP 116. The enhanced PHR features described by embodiments may further include enhanced PHR trigger conditions and procedures. For example, an enhanced PHR trigger condition may include PHR triggers defined per TRP. The PHR configurations used herein may be per TRP, UE, serving cell, or serving cell group.

In some embodiments, UE capability signaling for the enhanced PHR features may be used. For example, in a first option, the UE 104 may support both the enhanced PHR MAC CE and the enhanced PHR trigger conditions. In a second option, the UE 104 may only support the enhanced PHR trigger conditions. Thus, in the second option the UE 104 may not support the enhanced PHR MAC CE. These UE capabilities may be signaled to one or more of the base stations 120.

The access network 108 may provide a PHR configuration to the UE 104 based on the signaled UE capabilities. For example, the access network 108 may configure the UE 104 with PHR features in accordance with one or more of the following options. In a first option, the access network 108 may configure the UE 104 with both the enhanced PHR MAC CE and the enhanced PHR trigger condition. In a second option, the access network 108 may configure the UE 104 with a legacy PHR MAC CE and the enhanced trigger condition. In a third option, the access network 108 may configure the UE 104 with a legacy PHR procedure (for example, both legacy PHR MAC CE and legacy trigger condition). The legacy PHR procedure may be similar to that described in 3GPP TS 38.321 v16.7.0 (2021-12-23).

The access network 108 may implicitly or explicitly configure the enhanced PHR features with, for example, RRC signaling. The access network 108 may explicitly configure the enhanced PHR features by using a mTRP PHR parameter (mTrpPhr) that enables or disables the mTRP PHR feature. For example, mTrpPhr may be set to 'true' to enable the mTRP PHR features and may be set to 'false' to disable the mTRP PHR features. For another example, mTrpPhr may be set to a first value to enable the first option of PHR configuration (e.g., enhanced PHR MAC CE and the enhanced PHR trigger condition), set to a second value to enable the second option of PHR configuration (for example, enhanced PHR trigger condition and legacy PHR MAC CE), or set to a third value to enable the third option of PHR configuration (for example, legacy PHR procedure).

The access network 108 may implicitly configure the enhanced PHR features by tying the enhanced PHR features to the mTRP PUSCH repetition configuration. For example, if the mTRP PUSCH repetition is configured, the UE 104 may autonomously enable the TRP-specific PHR features based on UE capability or preference.

Selection of PHR MAC CE formats may be performed in a number of different ways according to various embodiments. For example, some embodiments describe that the use of the legacy PHR MAC CE or the enhanced PHR MAC CE is based on a network configuration. A base station may use RRC signaling to establish that a PHR procedure for a serving cell involves reporting of two PH values. In some embodiments, a truncated PHR MAC CE may be used if the uplink grant size cannot accommodate the whole PHR MAC CE. These and other embodiments will be described in further detail herein.

The enhanced PHR MAC CE format may include a single entry format or a multi-entry format. FIG. 2 illustrates single-entry enhanced PHR MAC CE formats in accordance with some embodiments. The single-entry enhanced PHR MAC CE formats of FIG. 2 include formats 204, 208, and 212. These formats may be used when CA or DC is not configured.

Format 204 includes three octets. The first octet includes a P-bit field, a V-bit field, and a PH field; and the second octet includes a reserved (R) field, a V-bit field, and a PH field. The V-bit field and the PH field of the first octet may correspond to a first TRP (shown as TRP 1, which may correspond to a first one of TRP 112 or TRP 116), while the V-bit field and the PH field of the second octet may correspond to a second TRP (shown as TRP 2, which may correspond to a second one of the TRP 112 or TRP 116). The third octet includes an MPE field (or reserved field) and a $P_{CMAX,f,c}$ field.

The PH field may be used to indicate a PH level that is associated with a corresponding TRP. The PH field may have a length of six bits. The reported PH may correspond to a PH level provided by a table (for example, Table 6.1.3.8-1 of 3GPP TS 38.321 v16.7.0 (2021-12)), with the corresponding measured values in dB specified in, for example, 3GPP TS 38.133 v17.3.0 (2021-10-04).

The P-bit field may be used to provide a P-MPR indication. The interpretation of this field may be based on serving cell configuration and whether the serving cell operates on FR1 or FR2. For example, if mpe-Reporting-FR2 is configured and the serving cell operates on FR2, the MAC entity shall set the P-bit field to '0' if a P-MPR value applied to meet MPE requirements is less than P-MPR_00 as specified in TS 38.133; and to '1' otherwise. If mpe-Reporting-FR2 is not configured or the serving cell operates on FR1, the P-bit field indicates whether power backoff is applied due to power management. The MAC entity shall set the P-bit field to '1' if the corresponding $P_{CMAX,f,c}$ field would have had a different value if no power backoff due to power management had been applied; and to '0' otherwise. The P-bit field may be set separately for the first and second TRPs, or may be set per cell, in which case only one P-bit field is valid (and the other is treated as a reserved field as shown in format 204).

The V-bit field may indicate whether the associated PH value is a based on a real transmission or a reference format. If the associated PH value is based on a reference format, it may be said to be based on a "virtual" transmission. A PH value based on a real transmission may be referred to herein as a "real PH value," while a PH value based on a virtual transmission may be referred to herein as a "virtual PH value." For Type 1 PH, the V-bit field may be set to '0' to indicate real transmission on PUSCH and the V-bit field may be set to '1' to indicate that a PUSCH reference format is used.

The V-bit field may be set to '0,' indicating the associated PH value is based on a virtual transmission, if the PH value associated with the other TRP is based on a real transmission (for example, an actual transmission is only performed by one of the two TRPs). The V-bit field may not be set to '0' in both the first and second octets.

The MPE or R field may be two bits, the interpretation of which may be based on serving cell configuration and whether the serving cell operates on FR1 or FR2. For example, if mpe-Reporting-FR2 is configured, the serving cell operates on FR2, and the P-bit field is set to '1,' the MPE or R field may provide an MPE value to indicate the power backoff applied to meet MPE requirements. This MPE value may indicate an index to a table (for example, Table 6.1.3.8-3 in 3GPP TS 38.321) and the corresponding measured values of P-MPR levels in dB may be specified in, for example, 3GPP TS 38.133. If mpe-Reporting-FR2 is not configured, the serving cell operates on FR1, or the P-bit field is set to '0,' reserve (R) bits may be present in the MPE or R field.

The $P_{CMAX,f,c}$ field may indicate a configured maximum output power for the UE for carrier f of serving cell c in each slot. The $P_{CMAX,f,c}$ field may provide a value that corresponds to a nominal UE transmit power level based on Table 6.1.2.8-2 of TS 38.321, which may be used for calculating the PH fields in the first and second octets. The reported $P_{CMAX,f,c}$ and corresponding nominal UE transmit power levels may be provided in a table (for example, Table 6.1.3.8-2 of 3GPP TS 38.321) and the corresponding measured values in dBm may be specified in, for example, TS 38.133.

In format 204, selection of TRP 1 and TRP 2 may be based on a TRP identifier (ID) or on an SRS-set index, which may be used to represent the TRP-ID. For example, if TRP 112 has a TRP-ID/SRS-set-index that is lower than the TRP-ID/SRS-set index of TRP 116, TRP 112 may be considered TRP 1 and its information may be placed in the first octet.

Format 208 may be a single-entry enhanced PHR MAC CE with fields similar to those described above with respect to format 204. Format 208 may include a first octet with information corresponding to TRP a, which may be a first one of TRP 112 or TRP 116, and a second octet with information corresponding to TRP b, which may be the second one of TRP 112 or TRP 116. In contrast to the ordering of the TRP information of format 204, which may be based solely on the TRP-ID/SRS-set-index, the ordering of the TRP information of format 208 may depend on which PH value is based on a real transmission. In particular, the first octet may always be populated with a PH value that is based on the real transmission. The PH value of the second octet may be based either on a real transmission or a virtual transmission. So, while the second octet may include the V-bit field to indicate whether it is based on a real or virtual transmission, such a field is not required for the first octet and may, therefore, be reserved. In the event that both PH values are based on real transmissions, the selection of which TRP is TRP-a may be based on the TRP-IDs/SRS-set-indices in a manner similar to format 204.

Formats 204 and 208 may be used to provide cell-specific PHR parameters (for example, MPE, $P_{CMAX,f,c}$, and P values). That is, these values may correspond to both TRPs of a serving cell. Format 212 may be used to provide TRP-specific PHR parameters (for example, MPE, $P_{CMAX,f,c}$, and P values). In particular, format 212 has first and second octets for TRP a, which may be a first one of TRP 112 or TRP 116, and third and fourth octets for TRP b, which may be the second one of TRP 112 or TRP 116. The first octet may provide the P and PH values for TRP a, while the second octet provides the MPE and $P_{CMAX,f,c}$ values for TRP a. Similarly, the third octet may provide the P and PH values for TRP b, while the fourth octet provides the MPE and $P_{CMAX,f,c}$ values for TRP b.

In some embodiments, in addition or as an alternative to providing cell-specific or TRP-specific PHR parameters, some embodiments may include providing UE-specific or cell-group-specific PHR parameters. Reporting of such parameters may be associated with trigger conditions that are defined per UE, beam, serving cell, TRP, or serving cell group.

The TRP selected for TRP a may be one that has a PH value based on a real transmission, while the TRP selected for TRP b may be one that has a PH value based on a real or virtual transmission, similar to that described above with respect to format 208. Thus, a V-bit value may not be needed in the first octet. In other embodiments, TRP-specific MPE, $P_{CMAX,f,c}$, and P values may be provided in a manner similar to format 204, and the first/second octets may correspond to a TRP 1, which may have a PH value based on either a real or virtual transmission. In this embodiment, the first octet may include a V-bit value.

When there is a valid uplink grant and the PHR is triggered, the UE 104 may assemble a single-entry enhanced PHR MAC CE format, such as described above, and transmit it via the uplink grant. If only one TRP has data for transmission, the UE 104 will indicate this TRP's PH as being based on a real transmission and the other TRP's PH may be indicated as based on a virtual transmission. If both TRPs have data for transmission, the UE 104 will indicate both TRPs' PH values as being based on real transmissions.

Figure 3:
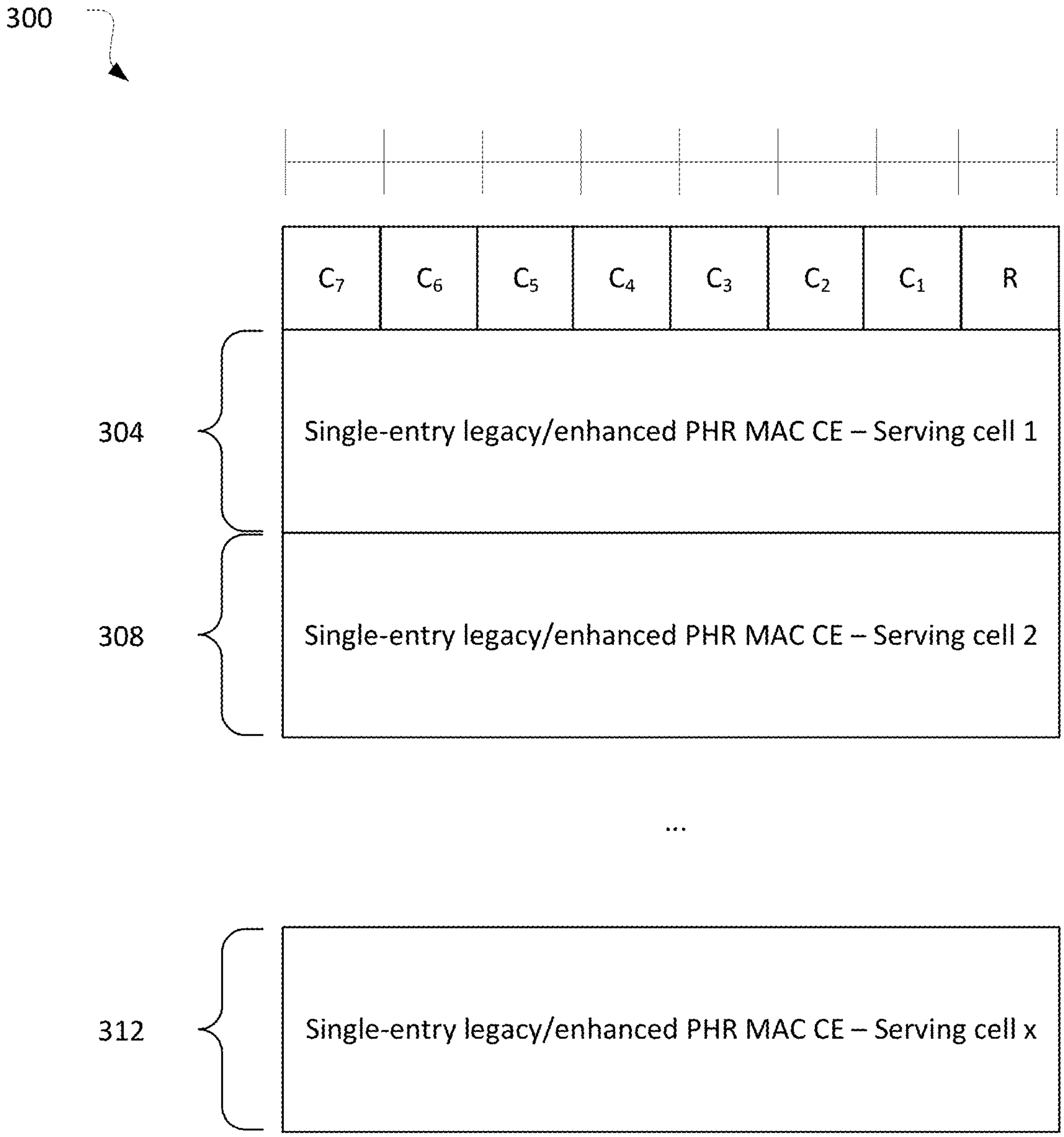
FIG. 3 illustrates a multiple-entry PHR MAC CE in accordance with some embodiments.

FIG. 3 illustrates a format 300 for a multiple-entry enhanced PHR MAC CE in accordance with some embodiments. The format 300 may be used when CA or DC is configured. One octet Ci indication (shown) or four octet Ci indication may depend on a number of configured component carriers.

The format 300 may include all PH values for active serving cells (X serving cells shown). The length of the format 300 may be variable.

A single-entry PHR MAC CE may be provided to report one or more PH values for each serving cell. If the serving cell has an mTRP PUSCH repetition configuration, the entry may be a single-entry enhanced PHR MAC CE similar to any of the options described with respect to FIG. 2. This may include a format providing cell-specific MPE, $P_{CMAX,f,c}$, and P values; or a format providing TRP-specific MPE, $P_{CMAX,f,c}$, and P values. If the serving cell does not have the mTRP PUSCH repetition configuration, the entry may be a single-entry legacy PHR MAC CE such as that described in 3GPP TS 38.321.

When there is a valid uplink grant and the PHR is triggered, the UE 104 may assemble a multiple-entry enhanced PHR MAC CE format, such as described above, and transmit it via the uplink grant. For each serving cell's PH information, the UE 104 may determine whether one PH value or two PH values are carried based on the mTRP PUSCH repetition configuration. If a serving cell is configured with mTRP PUSCH repetition but does not have a transmission, the UE 104 may generate the corresponding enhanced MAC CE format to indicate that both PH values are based on virtual transmissions, or may only include one PH value, which may be indicated as being based on a virtual transmission. If a serving cell configured with mTRP repetition schedules data for transmission to both TRPs, the UE 104 may set the enhanced PHR MAC CE to indicate that both PH values are based on real transmissions.

In the event a serving cell's entry has a cell-specific MPE, $P_{CMAX,f,c}$, and P values, the UE 104 may calculate the $P_{CMAX,f,c}$ value based on the real transmission. In the event a serving cell's entry has TRP-specific MPE, $P_{CMAX,f,c}$, and P values, the UE 104 may calculate the $P_{CMAX,f,c}$ values based on each TRP's power value.

In some embodiments, a UL grant size may not be large enough to accommodate a whole MAC CE. In this case, the UE 104 may generate a truncated multiple-entry enhanced PHR MAC CE. The truncated format may be associated with a new logical channel identifier (LCID). The information left out of the truncated multiple-entry enhanced PHR MAC CE may be determined according to one or more of the following options. In a first option, the UE 104 may only indicate the real PH values (for example, PH values based on real transmissions) together with associated $P_{CMAX,f,c}$ in the PHR format. In a second option, the UE 104 may only indicate the real PH values in the PHR format and may not include the $P_{CMAX,f,c}$. In a third option, the UE 104 may indicate partial PH information in the MAC CE. For example, the partial PH information may include PH information related to some active serving cells but not all of the active serving cells. The UE 104 may set the bits of the cell indication portion (for example, $C_1$-$C_7$) in a manner to identify the serving cells having PH information provided by the PHR MAC CE.

In some embodiments, the access network 108 may provide a network configuration to enable/disable enhanced PHR reporting or trigger conditions used to trigger the PHR.

Disclosed embodiments include three options for using a pathloss change to trigger PHR reporting. A pathloss change may refer to a change in the pathloss since a last transmission of a PHR. In a first option, PHR reporting may be triggered if a per-TRP pathloss change is more than a configured threshold (perTrpThreshold). In a second option, PHR reporting may be triggered if a per-beam pathloss change is more than a configured threshold (perBeam-Threshold). In a third option, PHR reporting may be triggered if a pathloss change is more than a configured threshold (phr-Tx-PowerFactorChange). The third option may correspond to a legacy PHR trigger condition and may have a coarser granularity as compared to the first or second options.

The PHR timers (for example, PHR periodic timer or PHR prohibit timer) used for the PHR triggering may be maintained per MAC entity, serving cell, TRP, or beam. The PHR timer maintenance may correspond to the option used for the pathloss change. For example, if the first option for the pathloss change is used, the PHR timers may be maintained per TRP, and if the second option for the pathloss change is used, the PHR timers may be maintained per beam.

If the enhanced PHR trigger condition is maintained per beam/TRP, one beam/TRP PH trigger condition being fulfilled may trigger a PHR. The UE 104 may have two options in this situation. In a first option, the UE 104 may include the triggered PH value in the enhanced PHR MAC CE. In the second option, the UE 104 may include all PH values from TRPs of the active cells. Virtual PH values may be included when there is no transmission for a particular TRP. In the event a UL grant size is not large enough to accommodate a full enhanced PHR MAC CE, the UE 104 may report a truncated PHR MAC CE. The truncated PHR MAC CE may only include real PH values, or it may include partial PH information as discussed above. In some embodiments, PH information omitted from the truncated PHR MAC CE may be provided in a subsequent PHR. The UE 104 may restart the beam/TRP specific timers when the corresponding PHR MAC CE is transmitted due to the trigger of the corresponding TRP's/beam's pathloss change.

If the enhanced PHR trigger condition is maintained per MAC entity, the UE 104 may report the PH values for all the TRPs of the activated cells in the enhanced PHR MAC CE. The UE 104 may only maintain one set of PHR timers based on the PH trigger and the PHR MAC CE transmission per MAC entity.

Various examples may be explained as follows based on enhanced PHR principles described herein.

A first example, which may be referred to as example 1a, may be provided as follows for PHR reporting in a non CA/DC case. Example 1a may be based on per-cell trigger and reporting. The access network 108 may configure one PCell. The PCell may be configured with mTRP PUSCH repetition but the enhanced PHR MAC CE may not be enabled.

The operation of the UE 104 in example 1a may include PHR trigger aspects and PHR reporting aspects.

With respect to the PHR trigger aspects, when the PHR is triggered, the UE 104 may report a legacy PHR MAC CE via a valid UL grant. The PHR may be triggered upon (1) expiration of the PHR period timer or (2) expiration of the PHR prohibit timer and a detection of a pathloss change greater than a configured threshold. After the legacy PHR MAC CE is delivered, the UE 104 may start the PHR timers (for example, the PHR prohibit timer and PHR periodic timer). The PHR timers may be maintained per MAC entity. Upon expiration of the PHR periodic timer, the UE 104 can report another legacy PHR MAC CE in another valid uplink grant.

With respect to the PHR reporting aspects, the UE 104 reporting of the legacy PHR MAC CE may be performed as follows. If data is to be transmitted to only one TRP, the UE 104 may calculate and report the PH value based on the TRP with the uplink transmission. If data is to be transmitted to two TRPs, the UE 104 may use one of the following options. In a first option, the UE 104 may calculate the PH value based on the power of both transmissions and report one PHR MAC CE. In a second option, the UE 104 may calculate the PH value based on the TRP/UL grant that is used for the PHR MAC CE. For example, if the UL grant provided for transmission to TRP 112 is used to transmit the PHR MAC CE, the power of the transmission to TRP 112 may be used to calculate the PH value reported in the PHR MAC CE. In a third option, the UE 104 may calculate two PH values separately for different TRPs. These two PH values may be reported in separate PHR MAC CEs via transmissions to corresponding TRPs.

The following options may be used for reporting PH values that may not be calculated based on an actual transmission for the PHR MAC CE. In a first option, the UE 104 may calculate the PH value based on transmission to one of the TRPs, the TRP may be selected according to a predefined or configured rule. Consider, for example, that the PHR MAC CEs are transmitted to the TRP 112. The first reporting may be for a PH value of TRP 112, a second reporting may be for a PH value of TRP 116, a third reporting may be for a PH value of TRP 112, and a fourth reporting may be for a PH value of TRP 116. Thus, the reported PH values may alternate from one TRP to the other in consecutive reports. In a second option, the UE 104 may calculate the PH value for a TRP that is associated with periodic timer that has expired. Consider, for example, that a PH value of TRP 112 is transmitted, which results in a PHR periodic timer for TRP 112 being started. Upon expiration of that timer, another PH value for TRP 112 may be transmitted.

A second example, which may be referred to as example 1b, may be provided as follows for PHR reporting in a non CA/DC case. Example 1b may be based on per-cell trigger and reporting. The access network 108 may configure one PCell. The PCell may be configured with mTRP PUSCH repetition and the enhanced PHR MAC CE may be enabled. For the PHR configuration, the access network 108 may configure one set of PHR parameters that is to be applied for both TRPs. The set of PHR parameters may include a PHR prohibit timer, a PHR periodic timer, and a pathloss change threshold.

The operation of the UE 104 in example 1b may include PHR trigger aspects and PHR reporting aspects.

With respect to the PHR trigger aspects, when the access network 108 enables the enhanced PHR feature and the PHR is triggered, the UE 104 may report an enhanced PHR MAC CE via a valid UL grant. The PHR may be triggered upon (1) expiration of the PHR periodic timer or (2) expiration of the PHR prohibit timer and a detection of a pathloss change greater than a configured threshold. After the enhanced PHR MAC CE is delivered, the UE 104 may start the PHR timers (for example, the PHR prohibit timer and PHR periodic timer). The PHR timers may be maintained per MAC entity. Upon expiration of the PHR periodic timer, the UE 104 can report another enhanced PHR MAC CE in another valid uplink grant.

With respect to the PHR reporting aspects, the UE 104 reporting of the enhanced PHR MAC CE may be performed as follows. The UE 104 may assemble the enhanced PHR MAC CE, which may be similar to the single-entry enhanced PHR MAC CE discussed with respect to FIG. 2. For the TRP with a real transmission, the UE 104 may provide an indication of a real transmission by setting a V-bit or by ordering of the PH information within the enhanced PHR MAC CE. If a TRP does not include a real transmission, the UE 104 may indicate the PH is a virtual PH.

The $P_{CMAX,f,c}$, MPE and P values, whether cell-specific or TRP-specific, used to calculate the real/virtual PH values may be provided in enhanced PHR MAC CE. In some embodiments, a UE may include N MPE values in the enhanced PHR MAC CE. The N MPE values may respectively correspond to N beams/reference signals (RSs)/RS sets. The number of MPE values may be larger than the number of reported PH levels. Thus, at least one of the N reference signals may not be used to calculate the PH levels for the first/second TRPs. In some instances, a plurality of possible N values may be configured by MPE configuration via RRC signaling, for example. The UE may then decide which N value to use by selecting the N value associated with the first maximum power backoff value due to power management. In some embodiments, the MPE configuration and reporting may be at least partially independent from the PHR configuration that is used to control the reporting of the configured maximum UE output power.

A third example, which may be referred to as example 1c, may be provided as follows for PHR reporting in a non CA/DC case. Example 1c may be based on per-TRP trigger and reporting. The access network 108 may configure one PCell similar to that described above with respect to example 1b. The PHR trigger and reporting may also be similar to that described with respect to example 1b; however, the second PHR trigger may be different. In particular, in example 1c the PHR may be triggered upon expiration of the PHR prohibit timer and a detection of a pathloss change of the same TRP being greater than a configured threshold.

A fourth example, which may be referred to as example 1 d, may be provided as follows for PHR reporting in a non CA/DC case. Example 1d may be based on per-TRP trigger and reporting. The access network 108 may configure one PCell similar to that described above with respect to example 1b. The PHR reporting may also be similar to that described with respect to example 1b.

With respect to the PHR trigger aspects of example 1d, when the access network 108 enables the enhanced PHR feature and the PHR is triggered, the UE 104 may report an enhanced PHR MAC CE via a valid UL grant. In general, the PHR trigger aspects may be similar to example 1b; however, the PHR timers (for example, the PHR periodic timer and PHR prohibit timer) may be maintained per TRP. A first PHR trigger may occur upon expiration of the TRP-specific PHR periodic timer. The TRP-specific PHR periodic timer may be restarted if the transmitted PHR MAC CE includes PH information for the same TRP. A second PHR trigger may occur upon expiration of the TRP-specific PHR prohibit timer and a detection of a pathloss change of the same TRP being greater than a configured threshold. The TRP-specific PHR prohibit timer may be restarted if the PHR is triggered by the pathloss change conditions of the same TRP.

A fifth example, which may be referred to as example 2a, may be provided as follows for PHR reporting in a CA case. Example 2a may be based on per-MAC entity trigger and reporting. The access network 108 may configure two serving cells, one PCell with mTRP PUSCH repetition and one SCell as a legacy serving cell. In example 2a, reporting with enhanced PHR MAC CE may not be enabled.

The PHR trigger aspects of example 2a may be similar to those described above with respect to example 1a.

With respect to the PHR reporting aspects, upon PHR triggering the UE 104 may assemble one legacy multiple-entry PHR MAC CE. If there is no transmission on the PCell, the UE 104 may calculate the virtual PH based on (a) either TRP (up to UE implementation); or (b) a default TRP, which may be based on configuration or a lowest/highest TRP index. If transmission to one TRP is scheduled in the PCell, the UE 104 may calculate the real PH value based on the real transmission. If transmissions to both TRPs are scheduled in the PCell, the UE 104 may calculate the real PH value based on both transmissions or based on one of the transmissions. If the UE 104 calculates the real PH value based on one of the transmissions, the selected transmission may be the one directed to a default TRP, which may be predefined or configured.

The following options may be used for reporting PH values that may not be calculated based on an actual transmission for the PHR MAC CE. In a first option, the UE 104 may calculate the PH value based on transmission to one of the TRPs, the TRP may be selected according to a predefined or configured rule. Consider, for example, that the PHR MAC CEs are transmitted to the TRP 112. The first reporting may be for a PH value of TRP 112, a second reporting may be for a PH value of TRP 116, a third reporting may be for a PH value of TRP 112, and a fourth reporting may be for a PH value of TRP 116. Thus, the reported PH values may alternate from one TRP to the other in consecutive reports. In a second option, the UE 104 may calculate the PH value for a TRP that is associated with periodic timer that has expired. Consider, for example, that a PH value of TRP 112 is transmitted, which results in a PHR periodic timer for TRP 112 being started. Upon expiration of that timer, another PH value for TRP 112 may be transmitted.

A sixth example, which may be referred to as example 2b, may be provided as follows for PHR reporting in a CA case. Example 2b may be based on per-MAC entity trigger and reporting. The access network 108 may configure two serving cells, one PCell with mTRP PUSCH repetition and one SCell with uplink resource configured as legacy. In example 2b, reporting with enhanced PHR MAC CE may be enabled.

The PHR trigger aspects of example 2b may be similar to those described above with respect to example 2a (and example 1a).

With respect to the PHR reporting aspects, upon PHR triggering the UE 104 may assemble an enhanced multiple-entry PHR MAC CE as follows. For an activated SCell, the setting of the PH, $P_{CMAX,f,c}$, and MPE values may be the same as the legacy PH procedure as described in, for example, 3GPP TS 38.321. For the PCell, the PH information may include PH values corresponding to both TRPs. For each TRP, the PH type and PH information may be decided and calculated based on the respective transmission and pathloss value.

In the event the uplink grant is not sufficient to accommodate the whole enhanced PHR MAC CE, the UE 104 may generate a truncated enhanced PHR MAC CE according to the uplink grant size. In the truncated PHR MAC CE, the UE 104 may only include the PH for the real transmission and may not restart the PHR timer.

Figure 4:
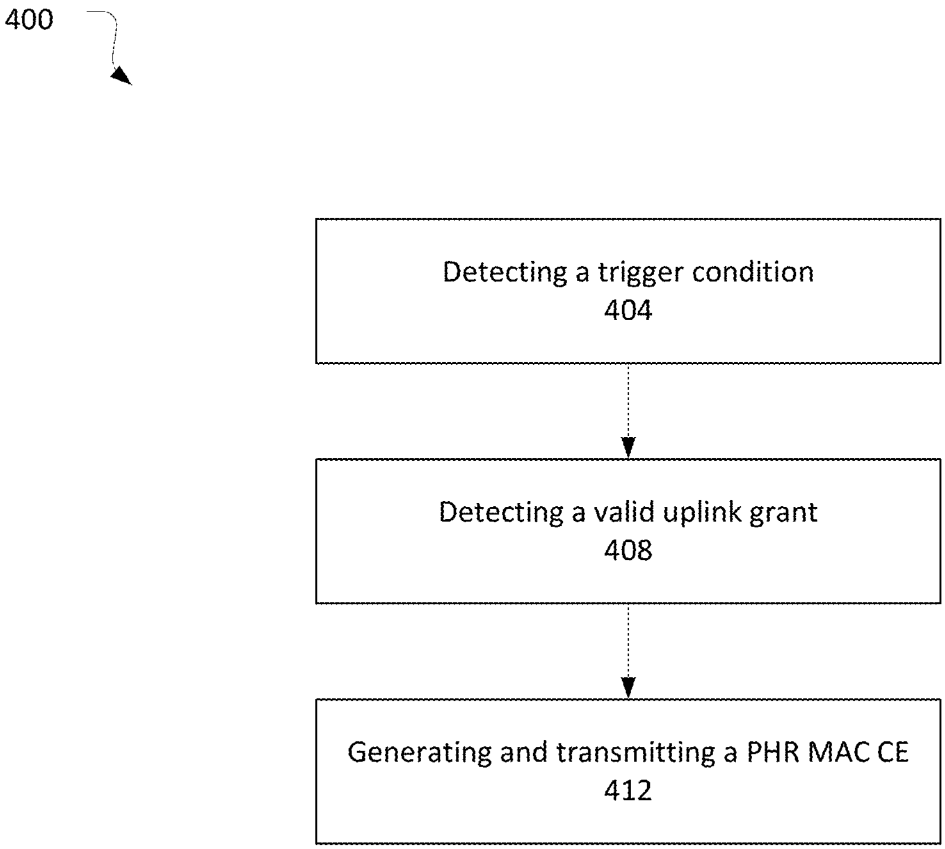
FIG. 4 illustrates an operation flow/algorithmic structure in accordance with some embodiments.

FIG. 4 may include an operation flow/algorithmic structure 400 in accordance with some embodiments. The operation flow/algorithmic structure 400 may be performed or implemented by a UE such as, for example, UE 104 or 600; or components thereof, for example, baseband processor 604A The operation flow/algorithmic structure 400 may include, at 404, detecting a trigger condition. The trigger condition may be a condition to trigger reporting of a PHR. The trigger condition may be based on configured PHR timers (for example, a PHR periodic timer or PHR prohibit timer) that may be maintained per MAC entity, serving cell, TRP, or beam. The trigger condition may be additionally/alternatively based on comparing pathloss changes to one or more configured thresholds. The pathloss change/configured thresholds may be associated with a specific TRP or beam, or they may be generally applicable to the serving cell or MAC entity.

The operation flow/algorithmic structure 400 may further include, at 408, detecting a valid uplink grant. The uplink grant may be provided for a transmission to a first or second TRP of a serving cell.

The operation flow/algorithmic structure 400 may further include, at 412, generating and transmitting a PHR MAC CE. The PHR MAC CE may include one or more PH values that respectively correspond to one or more TRPs of a serving cell. A PH value for a TRP may be based on a real transmission to the TRP, or based on a virtual transmission (for example, a reference format). In some embodiments, the first PH value and other associated PH information within the PHR MAC CE may be based on a real transmission, while subsequent PH values may be based on either real or virtual transmissions. The ordering of the PH value and associated PH information may additionally/alternatively be based on a TRP ID/SRS set index associated with the respective TRPs.

In some embodiments, in addition to TRP-specific PH values, the PHR MAC CE may include other PH information that is specific to the TRP's. This other information may include $P_{CMAX,f,c}$, P-bit, or MPE values. One of or more of these other PH values may be generically applied to both/all TRPs in other embodiments.

The PHR MAC CE may be a single-entry PHR MAC CE having PH information corresponding to one serving cell, or may be a multiple-entry PHR MAC CE having PH information corresponding to a plurality of serving cells. Each entry of a multiple-entry PHR MAC CE may have information corresponding to a single-entry legacy PHR MAC CE or a single-entry enhanced PHR MAC CE, depending on serving cell configurations or UE capabilities.

The generated PHR MAC CE may be transmitted in the valid uplink grant. In the event the valid uplink grant is not large enough to accommodate the entire PHR MAC CE, a truncated PHR MAC CE may be generated with a subset of the information included in the entire PHR MAC CE.

Figure 5:
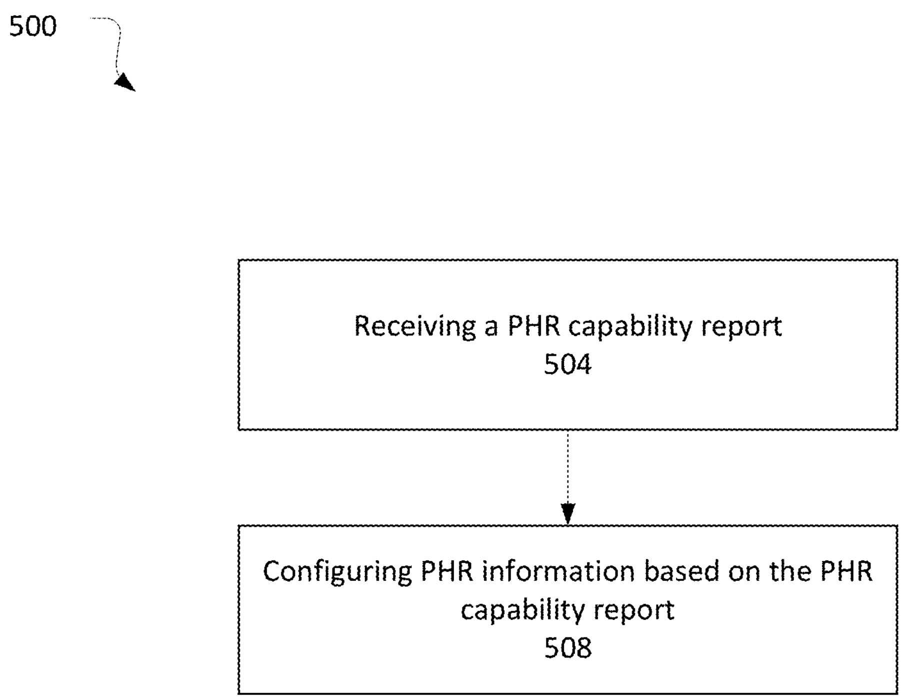
FIG. 5 illustrates another operation flow/algorithmic structure in accordance with some embodiments.

FIG. 5 may include an operation flow/algorithmic structure 500 in accordance with some embodiments. In some embodiments, the operation flow/algorithmic structure 500 may be performed or implemented by a base station, for example, one of the base stations 120 or 700; or components thereof, for example, baseband processor 704A.

The operation flow/algorithmic structure 500 may include, at 504, receiving a PHR capability report from a UE. The PHR capability report may indicate whether the UE supports enhanced PHR features (for example, enhanced MAC CEs or enhanced PHR triggers). The PHR capability report may indicate the UE supports none, some, or all of the enhanced PHR features.

Figure 6:
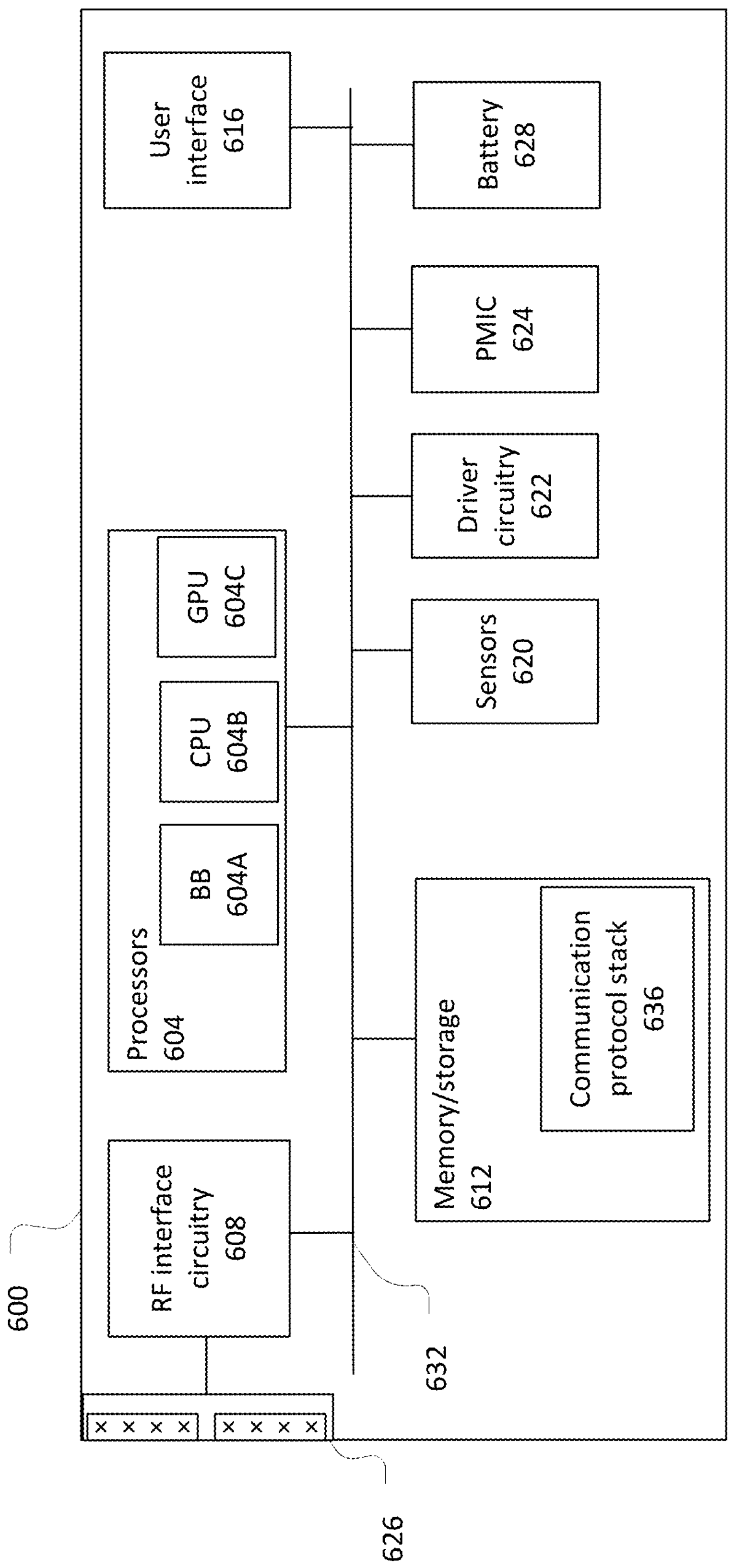
FIG. 6 illustrates a user equipment in accordance with some embodiments.

The operation flow/algorithmic structure 500 may further include, at 508, configuring PHR information based on the PHR capability report. In some embodiments, the PHR information may be configured by transmitting a specific PHR configuration parameter to configure one or more of the enhanced PHR features. In other embodiments, the PHR information may be configured by configuring a serving cell with mTRP PUSCH repetition, which may be associated with one or more of the enhanced PHR features FIG. 6 illustrates a UE 600 in accordance with some embodiments. The UE 600 may be similar to and substantially interchangeable with UE 104.

The UE 600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 600 may include processors 604, RF interface circuitry 608, memory/storage 612, user interface 616, sensors 620, driver circuitry 622, power management integrated circuit (PMIC) 624, antenna structure 626, and battery 628. The components of the UE 600 may be implemented as integrated circuits (ICs), portions thereof, discrete electronic devices, or other modules, logic, hardware, software, firmware, or a combination thereof. The block diagram of FIG. 6 is intended to show a high-level view of some of the components of the UE 600. However, some of the components shown may be omitted, additional components may be present, and different arrangement of the components shown may occur in other implementations.

The components of the UE 600 may be coupled with various other components over one or more interconnects 632, which may represent any type of interface, input/output, bus (local, system, or expansion), transmission line, trace, or optical connection that allows various circuit components (on common or different chips or chipsets) to interact with one another.

The processors 604 may include processor circuitry such as, for example, baseband processor circuitry (BB) 604A, central processor unit circuitry (CPU) 604B, and graphics processor unit circuitry (GPU) 604C. The processors 604 may include any type of circuitry or processor circuitry that executes or otherwise operates computer-executable instructions, such as program code, software modules, or functional processes from memory/storage 612 to cause the UE 600 to perform operations as described herein.

In some embodiments, the baseband processor circuitry 604A may access a communication protocol stack 636 in the memory/storage 612 to communicate over a 3GPP compatible network. In general, the baseband processor circuitry 604A may access the communication protocol stack 636 to: perform user plane functions at a PHY layer, MAC layer, RLC layer, PDCP layer, and SDAP layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 608.

The baseband processor circuitry 604A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 612 may include one or more non-transitory, computer-readable media that includes instructions (for example, communication protocol stack 636) that may be executed by one or more of the processors 604 to cause the UE 600 to perform various operations described herein. The memory/storage 612 include any type of volatile or non-volatile memory that may be distributed throughout the UE 600. In some embodiments, some of the memory/storage 612 may be located on the processors 604 themselves (for example, L1 and L2 cache), while other memory/storage 612 is external to the processors 604 but accessible thereto via a memory interface. The memory/storage 612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 608 may include transceiver circuitry and radio frequency front module (RFEM) that allows the UE 600 to communicate with other devices over a radio access network. The RF interface circuitry 608 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 626 and proceed to filter and amplify (with a low-noise amplifier) the signal. The signal may be provided to a receiver of the transceiver that down-converts the RF signal into a baseband signal that is provided to the baseband processor of the processors 604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 626.

In various embodiments, the RF interface circuitry 608 may be configured to transmit/receive signals in a manner compatible with NR and sidelink access technologies.

The antenna 626 may include antenna elements to convert electrical signals into radio waves to travel through the air and to convert received radio waves into electrical signals. The antenna elements may be arranged into one or more antenna panels. The antenna 626 may have antenna panels that are omnidirectional, directional, or a combination thereof to enable beamforming and multiple input, multiple output communications. The antenna 626 may include microstrip antennas, printed antennas fabricated on the surface of one or more printed circuit boards, patch antennas, or phased array antennas. The antenna 626 may have one or more panels designed for specific frequency bands including bands in FR1 or FR2.

The user interface circuitry 616 includes various input/output (I/O) devices designed to enable user interaction with the UE 600. The user interface 616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 600.

The sensors 620 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 622 may include software and hardware elements that operate to control particular devices that are embedded in the UE 600, attached to the UE 600, or otherwise communicatively coupled with the UE 600. The driver circuitry 622 may include individual drivers allowing other components to interact with or control various input/output (I/O) devices that may be present within, or connected to, the UE 600. For example, driver circuitry 622 may include a display driver to control and allow access to a display device, a touchscreen driver to control and allow access to a touchscreen interface, sensor drivers to obtain sensor readings of sensor circuitry 620 and control and allow access to sensor circuitry 620, drivers to obtain actuator positions of electro-mechanic components or control and allow access to the electro-mechanic components, a camera driver to control and allow access to an embedded image capture device, audio drivers to control and allow access to one or more audio devices.

The PMIC 624 may manage power provided to various components of the UE 600. In particular, with respect to the processors 604, the PMIC 624 may control power-source selection, voltage scaling, battery charging, or DC-to-DC conversion.

A battery 628 may power the UE 600, although in some examples the UE 600 may be mounted deployed in a fixed location, and may have a power supply coupled to an electrical grid. The battery 628 may be a lithium ion battery, a metal-air battery, such as a zinc-air battery, an aluminum-air battery, a lithium-air battery, and the like. In some implementations, such as in vehicle-based applications, the battery 628 may be a typical lead-acid automotive battery.

Figure 7:
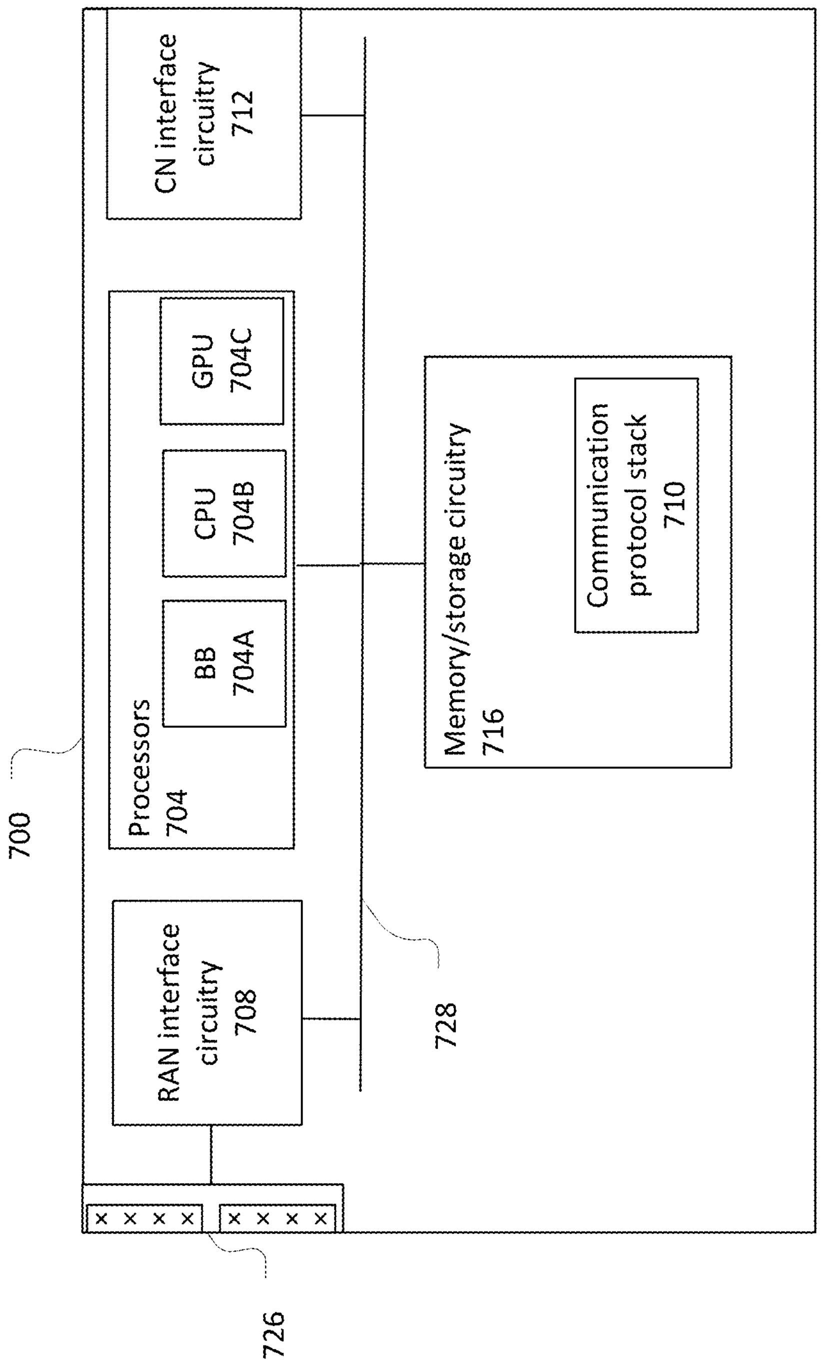
FIG. 7 illustrates a base station in accordance with some embodiments.

FIG. 7 illustrates a base station 700 in accordance with some embodiments.

The base station 700 may be similar to and substantially interchangeable with one of the base stations 120 of FIG. 1.

The base station 700 may include processors 704, RF interface circuitry 708 (if implemented as a base station), core network (CN) interface circuitry 712, memory/storage circuitry 716, and antenna structure 726 (if implemented as a base station).

The components of the base station 700 may be coupled with various other components over one or more interconnects 728.

The processors 704, RF interface circuitry 708, memory/storage circuitry 716 (including communication protocol stack 710), antenna structure 726, and interconnects 728 may be similar to like-named elements shown and described with respect to FIG. 6.

The CN interface circuitry 712 may provide connectivity to a core network, for example, a 5th Generation Core network (5GC) using a 5GC-compatible network interface protocol such as carrier Ethernet protocols, or some other suitable protocol. Network connectivity may be provided to/from the base station 700 via a fiber optic or wireless backhaul. The CN interface circuitry 712 may include one or more dedicated processors or FPGAs to communicate using one or more of the aforementioned protocols. In some implementations, the CN interface circuitry 712 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method comprising: detecting a trigger condition; and generating, based on the trigger condition, a power headroom report (PHR) media access control (MAC) control element (CE) with a first power headroom (PH) field to indicate a first PH level for a first transmit/ receive point (TRP) and a second PH field to indicate a second PH level for a second TRP.

Example 2 includes the method of example 1 or some other example herein, wherein the PHR MAC CE includes a first field to indicate whether the first power headroom level is based on a real transmission or a reference format; and a second field to indicate whether the second power headroom level is based on a real transmission or a reference format.

Example 3 includes method of example 2 or some other example herein, wherein the PHR MAC CE includes a first octet having the first PH field followed by a second octet having the second PH field, the first PH level is based on a real transmission, the second PH level is based on a reference format, and generating the PHR MAC CE comprises: indicating the first PH level with the first PH field of the first octet based on the first PH level being based on the real transmission; and indicating the second PH level with the second PH field of the second octet based on the second PH level being based on the reference format.

Example 4 includes a method of example 2 or some other example herein, wherein the PHR MAC CE includes a first octet having the first PH field followed by a second octet having the second PH field, the first TRP is associated with a first value, the second TRP is associated with a second value that is greater than the first value, and generating the PHR MAC CE comprises: indicating the first PH level with the first PH field of the first octet and indicating the second PH level with the second PH field of the second octet based on the second value being greater than the first value.

Example 5 includes a method of example 4 some other example herein, wherein: the first and second values are first and second TRP identifiers, respectively; or the first and second values are first and second sounding reference signal set indices, respectively.

Example 6 includes a method of example 1 or some other example herein, wherein the PHR MAC CE further comprises: a field to indicate a configured maximum user equipment (UE) output power used to calculate the first PH level and the second PH level.

Example 7 includes the method of example 1 or some other example herein, wherein the PHR MAC CE further comprises: a first field to indicate a first configured maximum user equipment (UE) output power used to calculate the first PH level; and a second field to indicate a second configured maximum UE output power used to calculate the second PH level.

Example 8 includes the method of example 1 or some other example herein, wherein the PHR MAC CE further comprises: a field to indicate an applied power backoff level to meet a maximum permissible exposure (MPE) requirement for the first and second TRPs.

Example 9 includes the method of example 1 or some other example herein, wherein the PHR MAC CE further comprises: a first field to indicate a first applied power backoff level to meet a maximum permissible exposure (MPE) requirement for the first TRP; and a second field to indicate a second applied power backoff level to meet the MPE requirement for the second TRP.

Example 10 includes the method of example 1 or some other example herein, wherein the PHR MAC CE is to indicate a plurality of maximum permissible exposure (MPE) values, the plurality of MPE values to respectively correspond to a plurality of reference signals, wherein at least one reference signal of the plurality of reference signals is not used to calculate the first or second PH levels.

Example 11 includes a method of example 1 or some other example herein, wherein the PHR MAC CE further comprises: a first field to indicate a power management—maximum power reduction indication for the first and second TRPs; or a first field to indicate a first power management—maximum power reduction indication for the first TRP and a second power management—maximum power reduction indication for the second TRP.

Example 13 includes the method of example 1 or some other example herein, wherein the PHR MAC CE further comprises: PHR parameters that are cell-specific or TRP-specific, the PHR parameters to include an applied power backoff level to meet a maximum permissible exposure (MPE) requirement, a configured maximum UE output power, or a power management—maximum power reduction indication.

Example 14 includes method of example 1 or some other example herein, wherein the PHR MAC CE further comprises: PHR parameters that are UE-specific or cell-group specific, the PHR parameters to include an applied power backoff level to meet a maximum permissible exposure (MPE) requirement, a configured maximum UE output power, or a power management—maximum power reduction indication, wherein the trigger condition is defined per beam, serving cell, or TRP.

Example 15 includes the method of any one of examples 1-14 or some other example herein, wherein the PHR MAC CE is a multiple-entry PHR MAC CE with a first entry corresponding to a first serving cell having the first and second TRPs and a second entry corresponding to a second serving cell.

Example 16 includes a method comprising: detecting an uplink grant and a power headroom report (PHR) trigger; identifying, based on said detecting, information to be included in a PHR media access control (MAC) control element (CE); generating the PHR MAC CE to include at least a portion of the information, wherein the portion of information includes a first entry corresponding to a first serving cell with a multi-transmit/receive point (mTRP) physical uplink shared channel (PUSCH) repetition configuration and a second entry corresponding to a second serving cell.

Example 17 includes the method of example 16 or some other example herein, wherein the portion of the information comprises: PHR parameters for the first serving cell, the PHR parameters are cell-specific or transmit/receive point (TRP)-specific and include an applied power backoff level to meet a maximum permissible exposure (MPE) requirement, a configured maximum user equipment (UE) output power, or a power management—maximum power reduction indication.

Example 18 includes the method of example 17 or some other example herein, wherein the PHR parameters are cell-specific and the method further comprises: calculating a configured maximum UE output power based on a real transmission in the first serving cell.

Example 19 includes the method of example 17 or some other example herein, wherein the PHR parameters are TRP-specific and the method further comprises: calculating a first configured maximum user equipment (UE) output power based on a first power value of a first TRP of the first serving cell; and calculating a second configured maximum UE output power based on a second power value of a second TRP of the first serving cell.

Example 20 includes the method of example 16 or some other example herein, wherein the portion of the information is a first portion and the method further comprises: determining the uplink grant is not large enough to accommodate all the information; and selecting a second portion of the information to exclude from the PHR MAC CE.

Example 21 includes a method of example 20 or some other example herein, wherein: the first portion includes a power headroom (PH) level based on a real transmission and an associated configured maximum user equipment (UE) output power and the second portion includes a PH level based on a reference format; the first portion includes a PH level based on a real transmission and the second portion includes a configured maximum UE output power associated with the PH level and a PH level based on a reference format; or the first portion includes PHR information corresponding a first active serving cell, the second portion includes PHR information corresponding to a second active serving cell, and the PHR MAC CE further includes one or more bits to identify the first active serving cell having correspond PHR information in the first portion.

Example 22 includes a method comprising: detecting a power headroom report (PHR) trigger condition associated with a transmit/receive point (TRP) or a beam of a serving cell; and generating a PHR media access control (MAC) control element (CE) based on said detecting; and transmitting the PHR MAC CE.

Example 23 includes a method of example 22 or some other example herein, wherein detecting the PHR trigger condition comprises: identifying a configured threshold; calculating a pathloss change for the TRP or the beam; and comparing the pathloss change to the configured threshold.

Example 24 includes the method of example 22 or some other example herein, wherein detecting the PHR trigger condition comprises: detecting an expiration of a PHR periodic timer or a PHR prohibit timer that is maintained for the TRP or the beam.

Example 25 includes the method of example 22 or some other example herein, wherein detecting the PHR trigger condition comprises detecting the PHR trigger condition for a first TRP or beam of the serving cell and the method further comprises: determining a PHR trigger condition is not detected for a second TRP or beam; and generating the PHR MAC CE to include: PH information for the first TRP or beam; or PH information for the both the first TRP or beam and second TRP or beam.

Example 26 includes a method of example 22 or some other example herein, further comprising: determining PHR information to be included in the PHR MAC CE; determining an uplink grant is not large enough to accommodate the PHR information; and generating the PHR MAC CE as a truncated PHR MAC CE with a subset of the PHR information.

Example 27 includes a method comprising: receiving information to configure a serving cell with multi-transmit/receive point (mTRP) physical uplink shared channel (PUSCH) repetition; determining whether enhanced power headroom report (PHR) reporting is enabled for the serving cell; detecting a PHR trigger; and generating and transmitting a PHR media access control (MAC) control element (CE) based on whether the enhanced PHR reporting is enabled.

Example 28 includes the method of example 27 or some other example herein, wherein the serving cell is configured with a first transmit/receive point (TRP) and a second TRP and the method further comprises: determining enhanced PHR reporting is not enabled for the serving cell; determining first data is to be transmitted to the first TRP and no data is to be transmitted to the second TRP; and generating the PHR MAC CE as a legacy PHR MAC CE with a power headroom (PH) level based on transmission of the first data.

Example 29 includes the method of example 27 or some other example herein, wherein the serving cell is configured with a first transmit/receive point (TRP) and a second TRP and the method further comprises: determining enhanced PHR reporting is not enabled for the serving cell; determining first data is to be transmitted to the first TRP and second data is to be transmitted to the second TRP; calculating a power headroom (PH) level based on power of transmission of the first data or the second data; and generating the PHR MAC CE as a legacy PHR MAC CE with an indication of the PH level.

Example 30 includes a method of example 29 or some other example herein, further comprising: determining that the PHR MAC CE is to be transmitted to the first TRP; and calculating the PH level based on power of transmission of the first data based on said determining that the PHR MAC CE is to be transmitted to the first TRP.

Example 31 includes the method of example 29 or some other example herein, wherein the PHR MAC CE is a first PHR MAC CE, the PH level is a first PH level calculated based on power transmission of the first data and the method further comprises: calculating a second PH level based on power of transmission of the second data; and generating a second PHR MAC CE with an indication of the second PH level.

Example 32 includes the method of example 29 or some other example herein, further comprising: selecting transmission of the first data or transmission of the second data as a basis for calculating the PH level based on a predefined rule or configuration.

Example 33 includes the method of example 29 or some other example herein, further comprising: calculating the PH level based on transmission of the first data based on an expiration of a periodic timer that is associated with the first TRP.

Example 34 includes the method of any one of examples 29-33, further comprising: receiving information to configure a plurality of cells in a carrier aggregation deployment.

Example 35 includes the method of example 27 or some other example herein, further comprising: determining that enhanced PHR reporting is enabled; receiving information to configure one set of PHR parameters for a first transmit/receive point (TRP) and a second TRP of the serving cell, the set of PHR parameters to include a prohibit timer, a periodic timer, and a pathloss change threshold; generating the PHR MAC CE as an enhanced PHR MAC CE; transmitting the enhanced PHR MAC CE; and starting the prohibit timer and the periodic timer based on said transmitting of the enhanced PHR MAC CE.

Example 36 includes a method of example 27 or some other example herein, further comprising: determining that enhanced PHR reporting is enabled; receiving information to configure a prohibit timer and a pathloss change threshold for a first transmit/receive point (TRP); generating the PHR MAC CE as an enhanced PHR MAC CE to include an indication of a power headroom level for the first TRP; detecting the PHR trigger based on expiration of the prohibit timer and detection of a pathloss change greater that the pathloss change threshold.

Example 37 includes the method of example 27 or some other example herein, further comprising: determining that enhanced PHR reporting is enabled; receiving information to configure a periodic timer for a first transmit/receive point (TRP); generating the PHR MAC CE as an enhanced PHR MAC CE to include an indication of a power headroom level for the first TRP; detecting the PHR trigger based on expiration of the periodic timer; and restarting the periodic timer after transmitting the enhanced PHR MAC CE.

Example 38 includes a method of operating a base station, the method comprising: receiving, from a user equipment (UE), a report to indicate whether the UE is capable of reporting transmit/receive point (TRP)-specific power headroom values in a power-headroom report (PHR); and transmitting, to the UE, configuration information to the UE based on the report.

Example 39 includes the method of example 38 or some other example herein, wherein the configuration information includes a parameter set to enable one or more multi-TRP (mTRP) PHR features.

Example 40 includes a method of example 39 or some other example herein, wherein the one or more mTRP PHR features comprise use of an enhanced PHR media access control (MAC) control element (CE) or use of enhanced PHR trigger conditions.

Example 41 includes the method of example 38 or some other example herein, wherein the configuration information comprises a multi-TRP (mTRP) physical uplink shared channel (PUSCH) repetition configuration.

Example 42 includes the method of example 38 or some other example herein, further comprising: receiving a PHR media access control (MAC) control element (CE) with a first power headroom (PH) field to indicate a first PH level for a first transmit/receive point (TRP) and a second PH field to indicate a second PH level for a second TRP. Example 32 includes the method of example 30 or some other example herein, wherein the field of the DCI corresponds to a reserved bits field.

Example 43 may include an apparatus comprising means to perform one or more elements of a method described in or related to any of examples 1-42, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-42, or any other method or process described herein.

Example 45 may include an apparatus comprising logic, modules, or circuitry to perform one or more elements of a method described in or related to any of examples 1-42, or any other method or process described herein.

Example 46 may include a method, technique, or process as described in or related to any of examples 1-42, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-42, or portions thereof.

Example 48 may include a signal as described in or related to any of examples 1-42, or portions or parts thereof.

Example 49 may include a datagram, information element, packet, frame, segment, PDU, or message as described in or related to any of examples 1-42, or portions or parts thereof, or otherwise described in the present disclosure.

Example 50 may include a signal encoded with data as described in or related to any of examples 1-42, or portions or parts thereof, or otherwise described in the present disclosure.

Example 51 may include a signal encoded with a datagram, IE, packet, frame, segment, PDU, or message as described in or related to any of examples 1-42, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-42, or portions thereof.

Example 53 may include a computer program comprising instructions, wherein execution of the program by a processing element is to cause the processing element to carry out the method, techniques, or process as described in or related to any of examples 1-42, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processor circuitry to:

detect a trigger condition; and generate, based on the trigger condition, a power headroom report (PHR) media access control (MAC) control element (CE) with a first power headroom (PH) field to indicate a first PH level associated with a first sounding reference signal (SRS) set of a serving cell and a second PH field to indicate a second PH level associated with a second SRS set of the serving cell.

2. The one or more non-transitory, computer-readable media of claim 1, wherein the PHR MAC CE includes a first field to indicate whether the first PH level is based on a real transmission or a reference format; and a second field to indicate whether the second PH level is based on a real transmission or a reference format.

3. The one or more non-transitory, computer-readable media of claim 2, wherein the PHR MAC CE includes a first octet having the first PH field followed by a second octet having the second PH field, the first PH level is based on a real transmission, the second PH level is based on a reference format, and the PHR MAC CE is to:

indicate the first PH level with the first PH field of the first octet based on the first PH level being based on the real transmission; and indicate the second PH level with the second PH field of the second octet based on the second PH level being based on the reference format.

4. The one or more non-transitory, computer-readable media of claim 2, wherein the PHR MAC CE includes a first octet having the first PH field followed by a second octet having the second PH field, the first SRS set is associated with a first value, the second SRS set is associated with a second value that is greater than the first value, and the PHR MAC CE is to:

indicate the first PH level with the first PH field of the first octet and indicate the second PH level with the second PH field of the second octet based on the second value being greater than the first value.

5. The one or more non-transitory, computer-readable media of claim 4, wherein the first and second values are first and second SRS set indices, respectively.

6. The one or more non-transitory, computer-readable media of claim 1, wherein the PHR MAC CE comprises:

a field to indicate a configured maximum user equipment (UE) output power used to calculate the first PH level and the second PH level.

7. The one or more non-transitory, computer-readable media of claim 1, wherein the PHR MAC CE comprises:

a field to indicate an applied power backoff level to meet a maximum permissible exposure (MPE) requirement for the first and second SRS sets.

8. The one or more non-transitory, computer-readable media of claim 1, wherein the instructions, when executed, further cause the processor circuitry to:

receive a multi-transmit or receive point (mTRP) physical uplink shared channel (PUSCH) repetition configuration from a base station; and generate the PHR MAC CE based on the mTRP PUSCH repetition configuration.

9. The one or more non-transitory, computer-readable media of claim 1, wherein the PHR MAC CE is to indicate a plurality of maximum permissible exposure (MPE) values, the plurality of MPE values to respectively correspond to a plurality of reference signals, wherein at least one reference signal of the plurality of reference signals is not used to calculate the first or second PH levels.

10. The one or more non-transitory, computer-readable media of claim 1, wherein the PHR MAC CE corresponds to a serving cell and further comprises: a first field to indicate a power management—maximum power reduction indication associated with the first and second SRS sets; or a first field to indicate a first power management—maximum power reduction indication associated with the first SRS set and a second power management—maximum power reduction indication associated with the second SRS set.

11. The one or more non-transitory, computer-readable media of claim 1, wherein to detect the trigger condition the processor circuitry is to:

identify a configured threshold;

calculate a pathloss change; and compare the pathloss change to the configured threshold.

12. A method comprising:

detecting a trigger condition; and generating, based on the trigger condition, a power headroom report (PHR) media access control (MAC) control element (CE) with a first power headroom (PH) field to indicate a first PH level associated with a first sounding reference signal (SRS) set of a serving cell and a second PH field to indicate a second PH level associated with a second SRS set of the serving cell.

13. The method of claim 12, wherein the PHR MAC CE includes a first field to indicate whether the first PH level is based on a real transmission or a reference format; and a second field to indicate whether the second PH level is based on a real transmission or a reference format.

14. The method of claim 13, wherein the PHR MAC CE includes a first octet having the first PH field followed by a second octet having the second PH field, the first SRS set is associated with a first value, the second SRS set is associated with a second value that is greater than the first value, and the PHR MAC CE is to:

indicate the first PH level with the first PH field of the first octet and indicate the second PH level with the second PH field of the second octet based on the second value being greater than the first value.

15. The method of claim 14, wherein the first and second values are first and second SRS set indices, respectively.

16. The method of claim 12, further comprising:

receiving a multi-transmit or receive point (mTRP) physical uplink shared channel (PUSCH) repetition configuration from a base station; and generating the PHR MAC CE based on the mTRP PUSCH repetition configuration.

17. The method of claim 12, wherein the PHR MAC CE corresponds to a serving cell and further comprises: a first field to indicate a power management—maximum power reduction indication associated with the first and second SRS sets; or a first field to indicate a first power management—maximum power reduction indication associated with the first SRS set and a second power management—maximum power reduction indication associated with the second SRS set.

18. The method of claim 12, wherein detecting the trigger condition comprises:

identifying a configured threshold;

calculating a pathloss change; and comparing the pathloss change to the configured threshold.

19. A method comprising:

generating a multi-transmit or receive point (mTRP) physical uplink shared channel (PUSCH) repetition configuration for transmission to a user equipment (UE); and receiving, from the UE, a power headroom report (PHR) media access control (MAC) control element (CE) with a first power headroom (PH) field to indicate a first PH level associated with a first sounding reference signal (SRS) set of a serving cell and a second PH field to indicate a second PH level associated with a second SRS set of the serving cell.

20. The method of claim 19, further comprising:

generating, for transmission to the UE, an indication of a pathloss change threshold associated with a trigger condition for the PHR MAC CE.

* * * * *